(12) United States Patent
Determan et al.

(10) Patent No.: US 8,286,335 B2
(45) Date of Patent: Oct. 16, 2012

(54) METHOD OF ASSEMBLING A THERMAL EXPANSION COMPENSATOR

(75) Inventors: William Determan, Sylmar, CA (US); Daniel Edward Matejczyk, West Hill, CA (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 0 days.

(21) Appl. No.: 13/183,128

(22) Filed: Jul. 14, 2011

(65) Prior Publication Data
US 2012/0042500 A1     Feb. 23, 2012

Related U.S. Application Data

(62) Division of application No. 12/857,965, filed on Aug. 17, 2010, now Pat. No. 8,128,418.

(51) Int. Cl.
*H01F 7/06*     (2006.01)
(52) U.S. Cl. ........ 29/605; 29/602.1; 29/606; 242/437.3; 242/437.4; 242/443; 336/212; 336/234
(58) Field of Classification Search .......... 29/602.1, 29/605, 606; 242/437.3, 437.4, 443, 445.1; 336/212, 234
See application file for complete search history.

(56) References Cited

U.S. PATENT DOCUMENTS

| | | | |
|---|---|---|---|
| 4,959,567 A | 9/1990 | Ealey et al. | |
| 5,270,595 A | 12/1993 | Wisner | |
| 6,313,523 B1 | 11/2001 | Morris et al. | |
| 6,659,778 B2 | 12/2003 | Li | |
| 6,998,762 B2 | 2/2006 | Lubitz et al. | |
| 7,004,237 B2 | 2/2006 | Mathur et al. | |
| 7,004,293 B2 | 2/2006 | Schumans | |
| 7,067,964 B1 | 6/2006 | Kosinskii | |
| 7,258,541 B2 | 8/2007 | Novo | |
| 7,393,214 B2 | 7/2008 | DiStefano | |
| 7,479,016 B2 | 1/2009 | Takahashi et al. | |
| 7,514,828 B2 | 4/2009 | Vollmuth et al. | |
| 7,794,235 B2 * | 9/2010 | Wallace | 439/67 |
| 2008/0083447 A1 | 4/2008 | Sienel | |
| 2009/0114531 A1 | 5/2009 | Rasten et al. | |
| 2010/0078061 A1 | 4/2010 | Lu et al. | |

* cited by examiner

*Primary Examiner* — Paul D Kim
(74) *Attorney, Agent, or Firm* — Cantor Colburn LLP

(57) ABSTRACT

A thermal expansion compensator is provided and includes a first electrode structure having a first surface, a second electrode structure having a second surface facing the first surface and an elastic element bonded to the first and second surfaces and including a conductive element by which the first and second electrode structures electrically and/or thermally communicate, the conductive element having a length that is not substantially longer than a distance between the first and second surfaces.

6 Claims, 3 Drawing Sheets

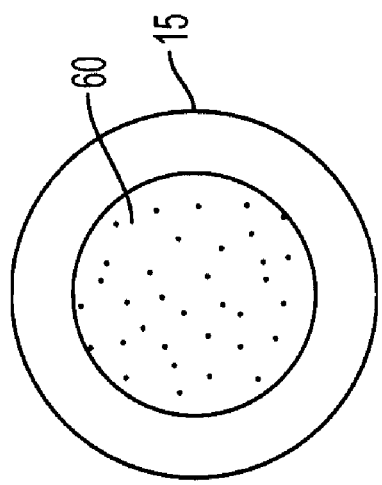
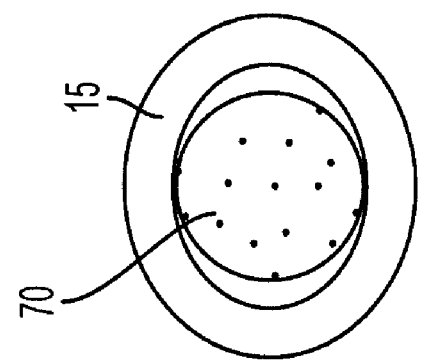

METHOD OF ASSEMBLING A THERMAL EXPANSION COMPENSATOR

CROSS-REFERENCE TO RELATED APPLICATION

The present application is a divisional application of and claims the benefit of priority to application Ser. No. 12/857,965, now U.S. Pat. No. 8,128,418 entitled, "THERMAL EXPANSION COMPENSATOR HAVING AN ELASTIC CONDUCTIVE ELEMENT BONDED TO TWO FACING SURFACES," which was filed on Aug. 17, 2010, the entire contents of which are incorporated herein by reference.

FEDERAL RESEARCH STATEMENT

This invention was conceived under contract no. 1320783 with the National Air and Space Administration (NASA) having an effective date of Mar. 11, 2008 and relating to differential growth of elements requiring a thermal-mechanical coupler with a low effective Young's Modulus. This invention is unclassified.

BACKGROUND OF THE INVENTION

The subject matter disclosed herein relates to a high temperature thermal expansion compensator.

High-temperature thermoelectric materials are generally brittle, they have a relatively high Young's Modulus and relatively low allowable strain. They also exhibit low ultimate tensile strength. Several classes of thermoelectric materials exist with different values for their coefficients of thermal expansion. When thermoelectric materials from two different classes are combined to form a new thermoelectric couple, then, the difference in their coefficient of thermal expansions requires that a compensation device be included within the structural frame of the couple to prevent buildup of high stress levels in the thermoelectric couple legs and their potential to fracture.

The required properties for such a compensator include a very low effective Young's Modulus, they should allow for high elastic strain, they should be compatible with the operating environment and have the capability to demonstrate metallurgical bonding of the compensator into the thermoelectric couple's electrodes. There are no known materials, or combination of materials in the form of gradated structures, which can satisfy all four criteria for the compensator simultaneously.

BRIEF DESCRIPTION OF THE INVENTION

According to one aspect of the invention, a thermal expansion compensator is provided and includes a first electrode structure having a first surface, a second electrode structure having a second surface facing the first surface and an elastic element bonded to the first and second surfaces and including a conductive element by which the first and second electrode structures electrically and/or thermally communicate, the conductive element having a length that is not substantially longer than a distance between the first and second surfaces.

According to another aspect of the invention, a thermal expansion compensator is provided and includes a first electrode structure having a first surface, a second electrode structure having a second surface facing the first surface and a series of coils arranged side-by-side and between the first and second electrode structures with respective portions of each of the coils metallurgically bonded to corresponding portions of the first and second surfaces.

According to another aspect of the invention, a thermal expansion compensator is provided and includes a first electrode structure having a first surface, a second electrode structure having a second surface facing the first surface and wiring, including two or more wire sections, each of which is coiled to form a coil section having opposing ends corresponding to opposing wire section ends and sides extending therebetween, each of the coil sections being disposed sidelong between the first and second electrode structures with respective portions of each of the coil section sides metallurgically bonded to corresponding portions of the first and second surfaces.

According to another aspect of the invention, a thermal expansion compensator is provided and includes a first electrode structure having a first surface, a second electrode structure having a second surface facing the first surface and wiring, including two or more wire sections, each of which is coiled to form a coil section having opposing ends corresponding to opposing wire section ends and sides extending therebetween, each of the coil sections being disposed between the first and second electrode structures such that longitudinal axes thereof are substantially parallel with respective planes of the first and second surfaces with respective portions of each of the coil section sides metallurgically bonded to corresponding portions of the first and second surfaces.

According to yet another aspect of the invention, a method of assembling a thermal expansion compensator is provided and includes disposing coils with pins inserted therein on a first foil layer disposed on a first electrode, disposing a second foil layer and then a second electrode on the pins and the coils, loading and then bonding the coils to the first and second foils layers and the first and second foil layers to the first and second electrodes to form an assembly, removing the pins and compressing the assembly in a direction perpendicular to a longitudinal direction of the coils to achieve a coil compression.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3A is an axial view of a first pin inserted into a coil; and FIG. 3B is an axial view of a second pin inserted into the coil of FIG. 3A having been compressed.

The detailed description explains embodiments of the invention, together with advantages and features, by way of example with reference to the drawings.

DETAILED DESCRIPTION OF THE INVENTION

Figure 1:
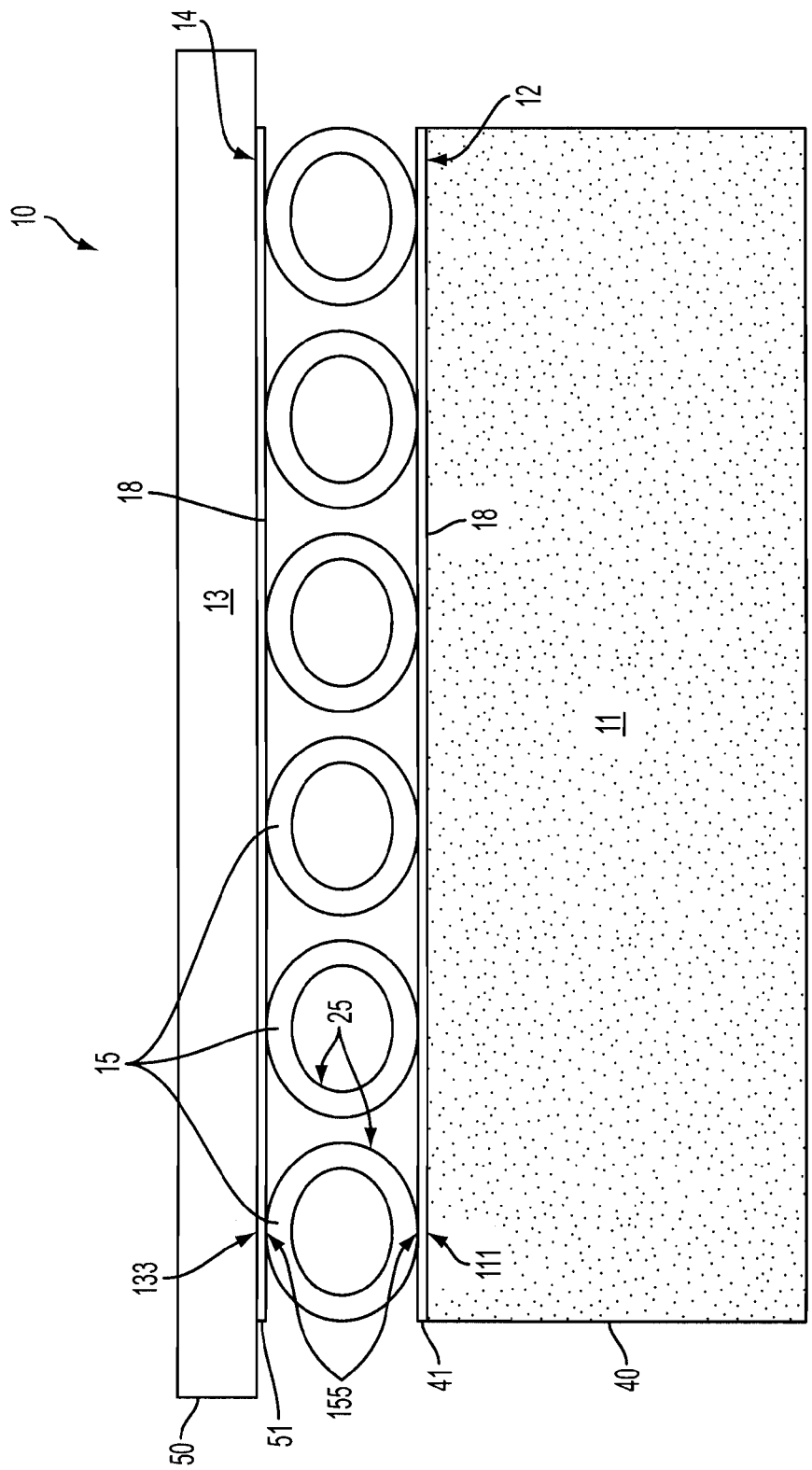
FIG. 1 is a side view of a thermal expansion compensator metallurgically bonded to electrodes.
Figure 2:
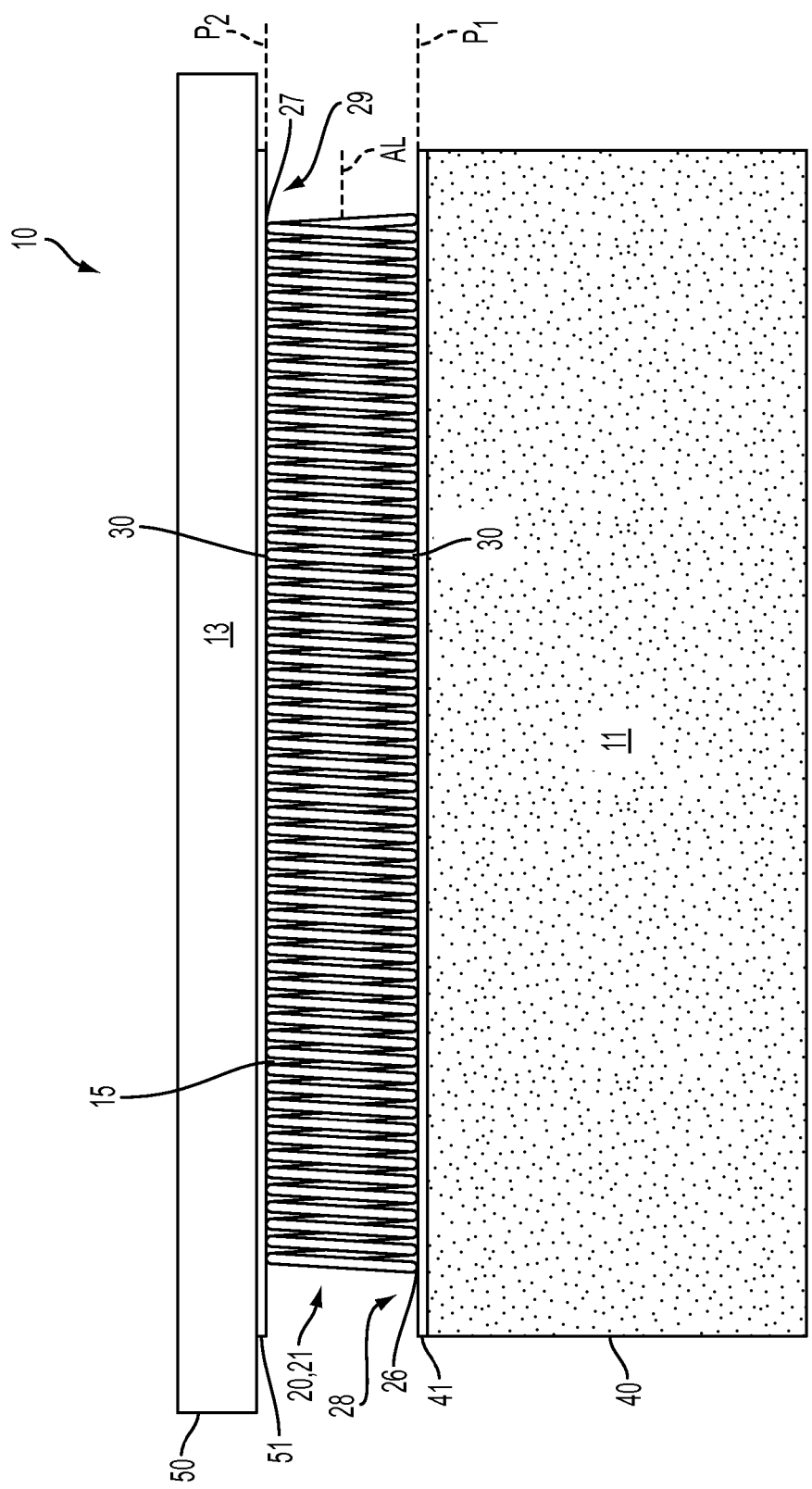
FIG. 2 is another side view of the compensator metallurgically bonded to electrodes.

With reference to FIGS. 1 and 2, a thermal expansion compensator 10 is provided and includes a first electrode structure 11 having a first surface 12, a second electrode structure 13 having a second surface 14 facing the first surface 12 and an elastic element bonded to the first and second surfaces 12 and 14. The elastic element includes an electrically and/or thermally conductive element by which the first and second electrode structures 11 and 13 electrically and/or thermally communicate with one another along pathways defined by the electrically and/or thermally conductive element. The electrically and/or thermally conductive element has a length that is not substantially longer than a distance between the first and second surfaces.

The elastic element may include cushioning resin or epoxy that is conductive or in which the conductive element is suspended, memory foam that is conductive or in which the conductive element is suspended, coils laid on end, coils laid on their sides as described below, leaf springs or similar types of elastic or cushioning devices. In any case, the pathways along which the first and second electrode structures 11 and 13 electrically and/or thermally communicate have respective lengths that are equal to or slightly longer than the distance between the first and second surfaces 12 and 14. That is, if the distance between the first and second surfaces 12 and 14 is X, the respective lengths of the pathways may be X to about 2X.

In accordance with embodiments, the thermal expansion compensator 10 is provided and includes the first electrode structure 11 having the first surface 12, the second electrode structure 13 having the second surface 14, which faces the first surface 12 and a series of coils 15 arranged side-by-side and between the first and second electrode structures 11 and 13 with respective portions 155 of each of the coils 15 metallurgically bonded to corresponding portions 111 and 133 of the first and second surfaces 12 and 14.

The coils 15 may be provided in numbers of two or more and may be formed of wiring, including two or more wire sections 20, 21, where each wire section 20, 21 is coiled into a coil section 25. The coil section 25 has opposing ends 26, 27 that correspond to opposing wire section ends 28, 29 and sides 30 extending between the opposing ends 26, 27. Each of the coil sections 25 may be disposed sidelong between the first and second electrode structures 11 and 13 such that longitudinal axes, $A_L$, of the coil sections 25 are substantially parallel with planes, $P_1$ and $P_2$, of the first and second electrode structures 11 and 13. With the coil sections 25 disposed in this manner, the respective portions 155 of for example each of the coil section sides 30 are metallurgically bonded to the corresponding portions 111, 133 of the first and second surfaces 12 and 14.

The coils 15 may include helical coiling with, for example, 85 turns per 0.285" or about 300 turns per inch. The coils 15 may be separate from one another, as shown in FIG. 1 or, in some cases, provided as a continuous serpentine structure whereby the coils 15 include substantially straight portions and, for example, hairpin sections. In any case, the coils 15 include wires or wiring having a relatively small diameter relative to a distance between the first and second electrode structures 11 and 13.

The first electrode structure 11 includes a base 40 formed of molybdenum (Mo) and, in some cases, stainless steel or similar materials. The first electrode 11 further includes a titanium (Ti) layer 41 at the first surface 12. Like the base, the coils 15 may be formed of molybdenum. The second electrode structure 13 is arranged similarly with a molybdenum base 50 and a titanium layer 51. In this way, when the thermal expansion compensator 10 is assembled, during a bonding process in which the thermal expansion compensator is loaded and heated to about 760 degrees Celsius for about 120 minutes, the molybdenum of the respective bases 40, 50 diffusion bonds with the titanium layers 41, 51 of the respective first and second surfaces 12 and 14. Similarly, the titanium layers 41, 51 of the respective first and second surfaces 12 and 14 diffusion bonds with the molybdenum of the coils 15 at the respective portions 155. Since the bonding temperature is relatively low as compared to, for example, the melting temperatures of components associated with the thermal expansion compensator 10, damage to those components during the bonding process can be avoided or substantially reduced.

The thermal expansion compensator 10 described herein thus employs a set of, for example, helical coils 15, made from relatively small diameter wire, which are laid on their sides 30. These coils 15 are metallurgically bonded into the first and second electrode structures 11 and 13. Once the bonding is achieved, the coils 15 act like springs in the orthogonal direction allowing elastic compression of each wire ring for a relatively low deflection force. Models of coil diametrical deflection with applied force can be applied to predict overall force-deflection behavior and to calculate its effective spring constant. In the thermal expansion compensator 10, therefore soft compliance (i.e., thermal expansion) is possible along with low thermal and electrical impedance. In particular, a relatively very low effective Young's Modulus is achieved under relatively high elastic strain levels of 15% or greater.

Coil diameter and coil-to-wire outside diameter ratios can be varied in the design of the thermal expansion compensator 10 to change the desired elastic deflection range. The number of coils 15, the wire material and its treatment and the number of turns per inch of coil 15 can be changed to adjust the effective spring constant. The wire material can be selected or a twisted wire rope construction can be used for different operating environments and other uses.

In accordance with further aspects of the invention, the thermal expansion compensator 10 is assembled with reference to FIG. 3A. Initially, the coils 15 are formed and positioned onto pins 60, such as temporary molybdenum pins, and held with a holder. The holder, the pins 60 and the coils 15 are then positioned on temporary foil for subsequent transfer. A layer 41 of titanium foil (0.0005" thick) is then placed onto a molybdenum base 40 of the first (hot) electrode structure 11 and the holder, the pins 60 and the coils 15 are placed on top of the titanium layer 41. At this point, positions of the pin 60 and the titanium layer 41 are verified and a second titanium layer 51 is placed on top of the coils 15. The base 50 of the second electrode structure 13 is then placed on the layer 51, a remainder of tooling for applying load is installed and the structure is transferred to, for example, a furnace hearth where load application may be prepared.

The bonding process includes application of a downward load to the base 50 of the second electrode structure 13 and across the coils 15 to be bonded. Bonding is then performed at about 760 degrees Celsius for about 120 minutes. Once the bonding is complete, the pins 60 are removed from the coils 15 under a microscope as is necessary. Following pin 60 removal, the coils 15 may be optionally compressed using tooling to precisely control a position of the base 50. Thus, the thermal expansion compensator 10 assembly can be compressed to provide a desired compression of the coils 15 perpendicular to their longitudinal axes, $A_L$. This compression is optional and may be carried out to modify the coil shape, as shown in FIG. 3B, and thereby to modify the effective Young's modulus of the assembly.

With reference to FIG. 3B, a second optional bond cycle may be employed to provide for additional bonding beyond that which is achieved in the initial bonding. Here, a second set of pins 70, such as molybdenum pins or stainless steel pins, are selected and sized to precisely fit the inner diameter obtained in the coil 15 compression. The second pins 70 are installed and provide support during a second loading and bonding sequence, which is substantially similar to the initial sequence.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of assembling a thermal expansion compensator, the method comprising:
    disposing coils with pins inserted therein on a first foil layer disposed on a first electrode;
    disposing a second foil layer and then a second electrode on the pins and the coils;
    loading and then bonding the coils to the first and second foil layers and the first and second foil layers to the first and second electrodes to form an assembly; and
    removing the pins.

2. The method according to claim 1, further comprising compressing the assembly in a direction perpendicular to a longitudinal direction of the coils to achieve a coil compression.

3. The method according to claim 1, wherein the coils comprise molybdenum (Mo), the first and second foil layers comprise titanium (Ti) and the first and second electrodes comprise molybdenum (Mo).

4. The method according to claim 1, wherein the bonding comprises bonding at about 760 degrees Celsius for about 120 minutes.

5. The method according to claim 1, further comprising performing a second bonding operation following the removing of the pins to increase the bonding between the coils and the first and second foils layers and between the first and second foil layers to the first and second electrodes.

6. The method according to claim 5, wherein the performing of the second bonding operation comprises inserting second pins to tightly fit within the coils.

* * * * *